R. C. McKILIGET.
TROLLEY WHEEL ADJUSTER.
APPLICATION FILED JULY 2, 1920.
1,358,645.
Patented Nov. 9, 1920.
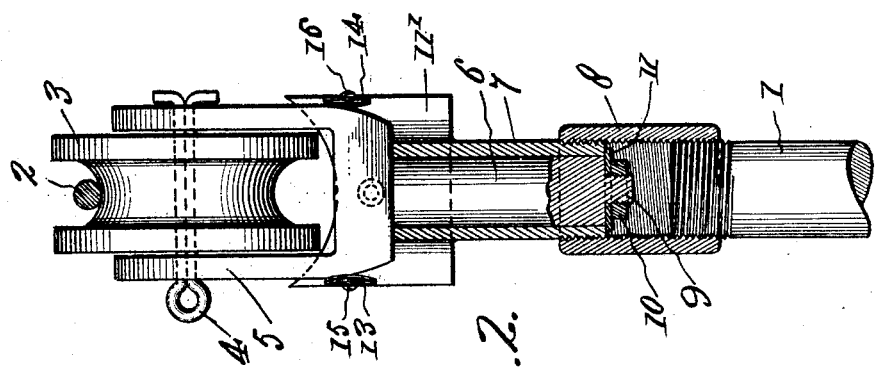
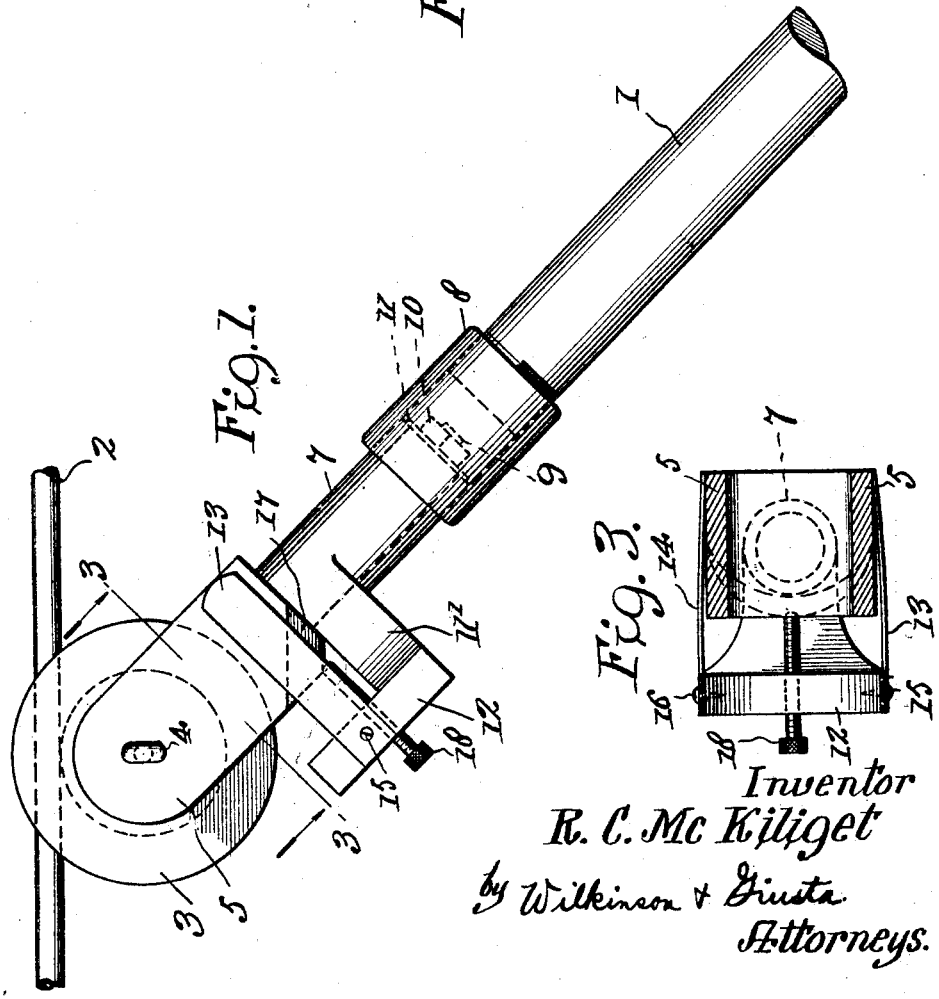
Inventor
R. C. McKiliget
by Wilkinson & Giusta
Attorneys.

UNITED STATES PATENT OFFICE.

RICHARD C. McKILIGET, OF NEW ORLEANS, LOUISIANA.

TROLLEY-WHEEL ADJUSTER.

1,358,645.   Specification of Letters Patent.   Patented Nov. 9, 1920.

Application filed July 2, 1920. Serial No. 393,690.

*To all whom it may concern:*

Be it known that I, RICHARD C. McKILIGET, a citizen of the United States, residing at New Orleans, in the parish of Orleans and State of Louisiana, have invented certain new and useful Improvements in Trolley-Wheel Adjusters; and I do hereby declare the following to be a full, clear, and exact description of the invention, such as will enable others skilled in the art to which it appertains to make and use the same.

The present invention relates to improvements in trolley wheels and mountings therefor, and has for an object to provide a pivotally mounted trolley wheel adapted to swing on the trolley pole so that it may follow the curvature of the trolley wire in rounding corners.

Another object of the invention resides in providing a simple and inexpensive construction of trolley wheel and support which will admit of the turning of the wheel axially on the pole, thus maintaining the groove in the wheel at all times parallel with the trolley wire.

A further object of the invention resides in providing an improved spring pressure means for acting to normally hold the trolley wheel in a position to engage a straight trolley wire but adapted to permit of the swinging of the wheel by the action of the wire on the wheel throughout curved portions of the wire.

In the accompanying drawings forming a part of this application, and in which similar reference symbols indicate corresponding parts in the several views:

Figure 1 is a fragmentary view in side elevation of a trolley pole and wheel with an improved support therefor constructed in accordance with the present invention.

Fig. 2 is an end view of the same with parts shown in section; and

Fig. 3 is a sectional view taken on the line 3—3 in Fig. 1.

Referring more particularly to the drawings, 1 designates the usual trolley pole connected in any suitable manner to the top of the car on which it is used, and 2 represents the trolley wire. A conventional wheel 3 is employed having a groove in which to receive the wire 2, as shown to advantage in Fig. 2. The wheel 3 is mounted on a cotter pin 4, or other form of support, which passes through the harp or fork 5. The lower portion of the harp 5 is carried on a spindle 6 which fits within a bearing box or sleeve 7. The sleeve 7 is exteriorly screw threaded at its lower end to receive the interior threads of a coupling collar 8, which is also threaded on the upper end of the trolley pole 1. The inner end of the spindle 6 is reduced as indicated at 9, and is screw threaded to receive the nut 10 by which a washer 11 may be clamped against the lower end of the sleeve 7.

The arrangement is such that the spindle 6 carrying the harp 5 and the trolley wheel 3, will be permitted to freely rotate about an axis which is an extension of the axis of the trolley pole 1. The coupling piece 8 and its adjacent parts also permit of the removability of the device from the trolley pole and allow of the substitution of worn or broken parts.

The bearing box or sleeve 7 is provided at its upper end with an arm 11' projecting downwardly and acting to support a lug 12. A pair of flat springs 13 and 14 are secured as by screws 15 and 16 to the ends of the lug 12. The springs are bent toward each other at their free ends and they embrace sides or cheeks of the harp or fork 5, in the manner indicated in Fig. 3.

The central portions of the flat springs 13 and 14 are spaced from the adjacent portions of the harp or fork, as clearly illustrated in Fig. 3, in order to permit of the swinging movement of the harp without interference from these portions of the spring. When the harp moves in either direction, however, these portions are moved against the spring so that the spring acts thereon, exerting a tendency to restore the harp to the normal position. The portions of the harp are cut away, as indicated at 17, so as not to interfere with the wide swinging movement thereof.

A set screw 18 is threaded through the lug 12 and is adapted to take against the harp 5 in order to bind the harp in any position of adjustment, if desired.

In use the trolley wheel 3 rolls beneath the wire 2 in the usual manner, with the exception that when curves are reached the wheel 3 will be permitted to turn by virtue of the pivoting of the harp 5 on the spindle 6. In this manner the wheel 3 is allowed to turn with the wire so that its groove is constantly kept in a correct position with reference to the wire and avoids jumping of the trolley wheel from the wire, which is a prolific source of annoyance at the present time. The flat springs 13 and 14 will permit of this movement without appreciable effort, and will quickly act to restore the wheel to its normal position once the curve is passed.

The screw 18 is normally disengaged from the harp, but should it be desired to set the wheel as, for instance, to travel about a curved track, the set screw may be tightened against the harp to hold the wheel constantly in a correct position with reference to the particular curvature of the track referred to.

It will be appreciated from the foregoing that I have provided a simple and inexpensive trolley wheel support which will closely follow curvatures in the trolley wire and not be apt to escape therefrom.

It is obvious that those skilled in the art may vary the details of construction and arrangements of parts without departing from the spirit of my invention, and therefore I do not wish to be limited to such features except as may be required by the claims.

I claim:

1. In combination with a trolley pole and a trolley wheel, of a harp carrying the wheel, a spindle projecting from the harp, a bearing box removably carried by the pole and receiving such spindle, a support carried by the bearing box, flat springs projecting from said support and engaging the sides of the harp, and means also carried by said support for acting on the harp to hold the wheel in an adjusted position, substantially as described.

2. In combination with a trolley pole and a trolley wheel, of a harp carrying the wheel, a spindle projecting from the harp, a bearing box removably carried by the pole for receiving such spindle, a support on such bearing box, flat springs extending from such support and being curved toward each other and engaging the side faces of the harp, the intermediate portions of the springs being spaced from the adjacent parts of the harp, and means carried by the support to hold the harp in any position of angular adjustment, substantially as described.

3. In combination with a trolley pole and a trolley wheel, of a harp carrying the wheel, means whereby the harp is rotatably supported from the pole, and flat springs carried by a part of said means and being curved toward each other, said springs adapted to engage at their ends the sides of the harp but being spaced at their intermediate portions away from such sides, substantially as described.

4. In combination with a trolley pole and a trolley wheel, of a harp carrying the wheel, a spindle with which the harp rotates, a bearing box for the spindle removably held on the pole, supporting means extending from the bearing box, flat springs on the supporting means curved toward one another with their free ends in contact with the sides of the harp and their intermediate portions normally out of contact therewith, and adjustable means carried by the supporting means for engaging the harp to hold it in various positions, substantially as described.

RICHARD C. McKILIGET.